US010878778B2

(12) United States Patent
Resudek et al.

(10) Patent No.: US 10,878,778 B2
(45) Date of Patent: Dec. 29, 2020

(54) REACTIVE INTERFACE BASED ON EYESTRAIN

(71) Applicant: PayPal, Inc., San Jose, CA (US)

(72) Inventors: Timothy Resudek, San Jose, CA (US); Joshua Greenwell, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/806,884

(22) Filed: Nov. 8, 2017

(65) Prior Publication Data

US 2019/0139514 A1 May 9, 2019

(51) Int. Cl.
*G09G 5/22* (2006.01)
*G09G 5/10* (2006.01)
*G06K 9/00* (2006.01)
*G06F 16/901* (2019.01)
*G06F 3/14* (2006.01)

(52) U.S. Cl.
CPC ............... *G09G 5/10* (2013.01); *G06F 3/14* (2013.01); *G06F 16/9017* (2019.01); *G06K 9/00617* (2013.01); *G09G 5/22* (2013.01); *G09G 2310/04* (2013.01); *G09G 2320/0626* (2013.01); *G09G 2354/00* (2013.01); *G09G 2360/144* (2013.01); *G09G 2370/022* (2013.01)

(58) Field of Classification Search
CPC .................................. G09G 5/00; G09G 5/10
See application file for complete search history.

(56) References Cited

U.S. PATENT DOCUMENTS

| | | | |
|---|---|---|---|
| 2006/0082727 A1 | 4/2006 | Bolger et al. | |
| 2012/0092172 A1* | 4/2012 | Wong | G06F 3/011 340/575 |
| 2012/0254779 A1* | 10/2012 | Ollivierre | A61B 3/0041 715/764 |
| 2016/0180801 A1* | 6/2016 | Lee | H04M 1/72569 345/156 |
| 2017/0090561 A1* | 3/2017 | Dow | G06F 3/013 |

* cited by examiner

*Primary Examiner* — Yi Yang
(74) *Attorney, Agent, or Firm* — Haynes and Boone, LLP (57) ABSTRACT

A computer system analyzes eyestrain information to detect whether a user of a computing device is currently experiencing eyestrain. In response to detecting that the user of the computing device is currently experiencing eyestrain, the computer system: identifies a first set of display settings corresponding to the computing device, stores the identified first set of display settings in a database, adjusts at least one of the first set of display settings, and in response to detecting that a reduction in the eyestrain being experienced by the user of the computing device exceeds a threshold amount, stores the adjusted first set of display settings in the database.

20 Claims, 5 Drawing Sheets

REACTIVE INTERFACE BASED ON EYESTRAIN

TECHNICAL FIELD

The present disclosure relates generally to detecting eyestrain of a user, and more particularly to a system for adjusting display settings based on detecting eyestrain of the user.

BACKGROUND

Today, with the sheer number of electronic devices that users are exposed to, eyestrain and eye issues can be a fairly large cause of concern for users. Furthermore, certain devices may have display settings that may cause a user to strain or perform functions that may be harmful to overall eye health. It may be advantageous to identify and implement a solution to the problem of eyestrain with regard to the use of electronic devices.

DETAILED DESCRIPTION

Embodiments of the present disclosure provide a system, method, and program product. A computer system analyzes eyestrain information to detect whether a user of a computing device is currently experiencing eyestrain. In response to detecting that the user of the computing device is currently experiencing eyestrain, the computer system: identifies a first set of display settings corresponding to the computing device, stores the identified first set of display settings in a database, adjusts at least one of the first set of display settings, and in response to detecting that a reduction in the eyestrain being experienced by the user of the computing device exceeds a threshold amount, stores the adjusted first set of display settings in the database.

In the example embodiment, the present disclosure describes a solution that detects an amount of eyestrain that a user of a computing device is experiencing. In the example embodiment, the present disclosure describes identifying the display settings that the computing device is set to during the times at which the user is experiencing eyestrain. Furthermore, the present disclosure describes identifying an adjusted set of settings that, when implemented, reduce or alleviate the eyestrain experienced by the user.

Furthermore, the present disclosure describes a solution where at a later time, a detection is made that the user is experiencing eyestrain or that the display settings are set to a specific configuration that has been identified to cause the user eyestrain. The present disclosure further describes determining the optimal settings based on the situation for the user and further based on previously identified eyestrain information corresponding to the user. In addition, the present disclosure describes adjusting the display settings to the determined optimal settings. In the example embodiment, by adjusting the display settings to the determined optimal settings upon determining that the current display settings have been previously identified as settings that have previously caused the user eyestrain, the present disclosure provides a solution where display settings may be pre-emptively adjusted prior to the user experiencing any eyestrain.

Embodiments of the present disclosure will now be described in detail with reference to the accompanying Figures.

Figure 1:
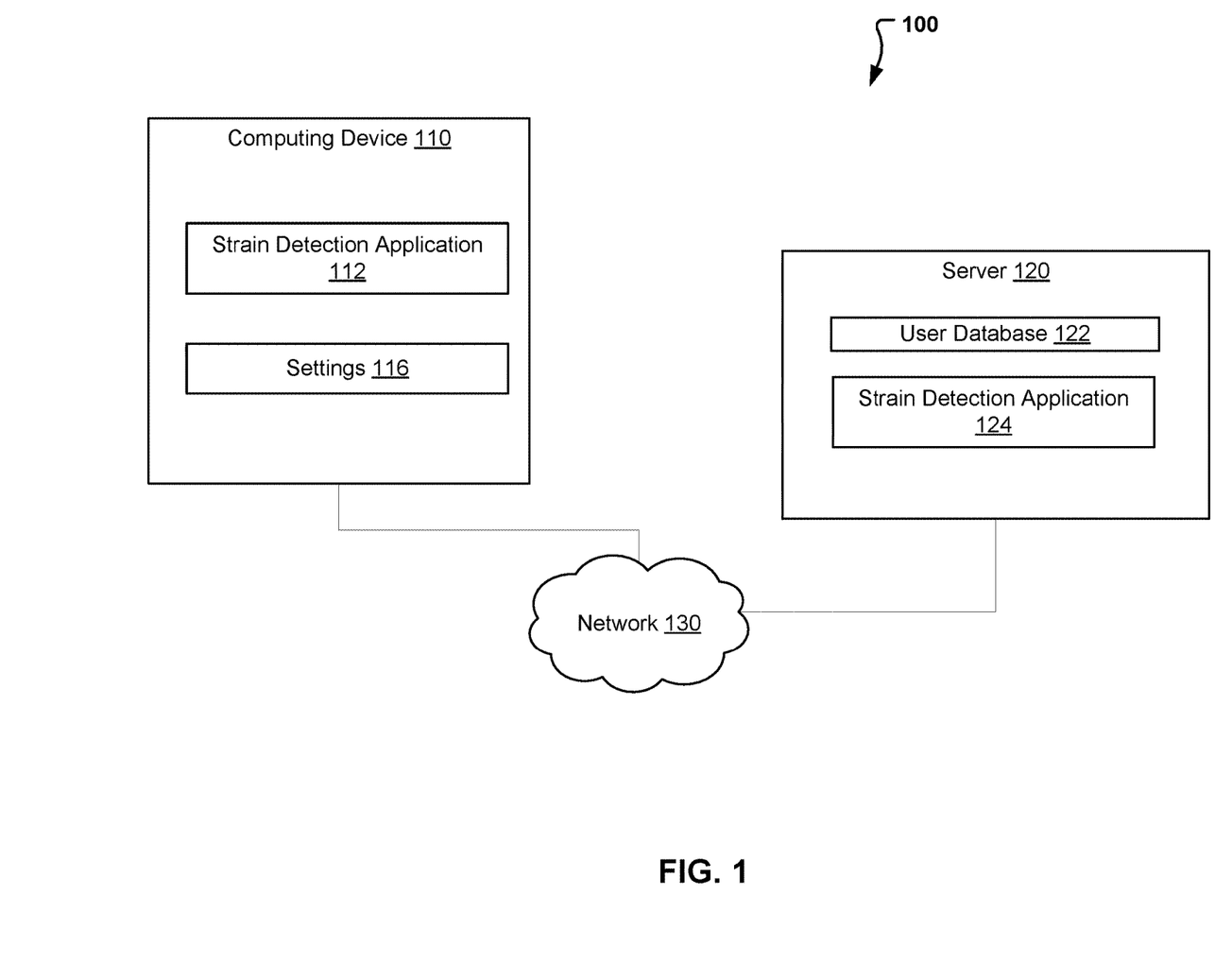
FIG. 1 illustrates a strain detection system, in accordance with an embodiment.

FIG. 1 illustrates strain detection system 100, in accordance with an embodiment. In the example embodiment, strain detection system 100 includes computing device 110 and server 120 all interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing devices, such as between computing device 110 and server 120.

Computing device 110 includes strain detection application 112 and settings 116. In the example embodiment, computing device 110 is a computing device such as a smartphone, however in other embodiments, computing device 110 may be a desktop computer, a laptop computer, a tablet computer, a handheld device, a thin client, or any other electronic device or computing system capable of receiving and sending data to and from other computing devices, such as server 120, via network 130. Computing device 110 is described in more detail with reference to FIG. 5.

In the example embodiment, strain detection application 112 is a client side application corresponding to server side strain detection application 124 located on server 120. In the example embodiment, strain detection application 112 is a software program capable of utilizing modules of computing device 110 to gather eyestrain information that may identify whether the user of computing device 110 is experiencing eyestrain. Furthermore, in the example embodiment, strain detection application 112 may communicate eyestrain information to strain detection application 124, and may further alter one or more settings of settings 116, based on information received from strain detection application 124. Strain detection application 112 is described in further detail with regard to FIGS. 2 through 4.

In the example embodiment, settings 116 are the display settings associated with computing device 110. For example, settings 116 may include the brightness, contrast, tint, text size, and any other settings that correspond to how an image or document is displayed to a user. In one or more embodiments, the display settings may be adjusted in order to reduce the amount of eyestrain being experienced by the user of computing device 110. Settings 116 is described in further detail with regard to FIGS. 2 through 4.

Server 120 includes strain detection application 124 and user database 122. Server 120 may be a desktop computer, a laptop computer, a tablet computer, a mobile device, a handheld device, a thin client, or any other electronic device or computing system capable of receiving and sending data to and from other computing devices, such as computing device 110, via network 130. Although not shown, optionally, server 120 can comprise a cluster of servers executing the same software to collectively process requests as distributed by a front-end server and a load balancer. In the example embodiment, server 120 is a server that supports strain detection application 124. Server 120 is described in more detail with reference to FIG. 5.

In the example embodiment, user database 122 is a database that includes account information corresponding to client side users of strain detection application 124 (such as the user of computing device 110). Furthermore, in the example embodiment, user database 122 includes a plurality of user records that include display settings information for each specific user. For example, a record of user database 122 may include specific display settings identified as causing eyestrain to a user, and further may include specific display settings that do not cause eyestrain to the user. Furthermore, the display settings may correspond to specific environmental conditions. For example, certain display settings may be identified as not causing eyestrain for User A, if User A is in a dim lit room. User database 122 is described in more detail with reference to FIGS. 2 through 4.

In the example embodiment, strain detection application 124 is a software program capable of detecting whether a user of a computing device, such as computing device 110, is experiencing eyestrain (such as by utilizing client application strain detection application 112 to gather eyestrain information as described above). Further, based on determining that the user is experiencing eyestrain, strain detection application 124 is further capable of identifying and storing the display settings of the computing device in user database 122. Furthermore, strain detection application 124 is capable of adjusting the display settings so that the user of the computing device no longer experiences eyestrain. Furthermore, strain detection application 124 is capable of storing the adjusted settings along with one or more associated environmental conditions for later use. In addition, strain detection application 124 is also capable of determining that the display setting on a computing device may cause eyestrain to a user, and based on the determination, preemptively adjusting the settings based on stored information associated with the user. The operations of strain detection application 124 are described in further detail with regard to FIGS. 2 through 4.

Figure 2:
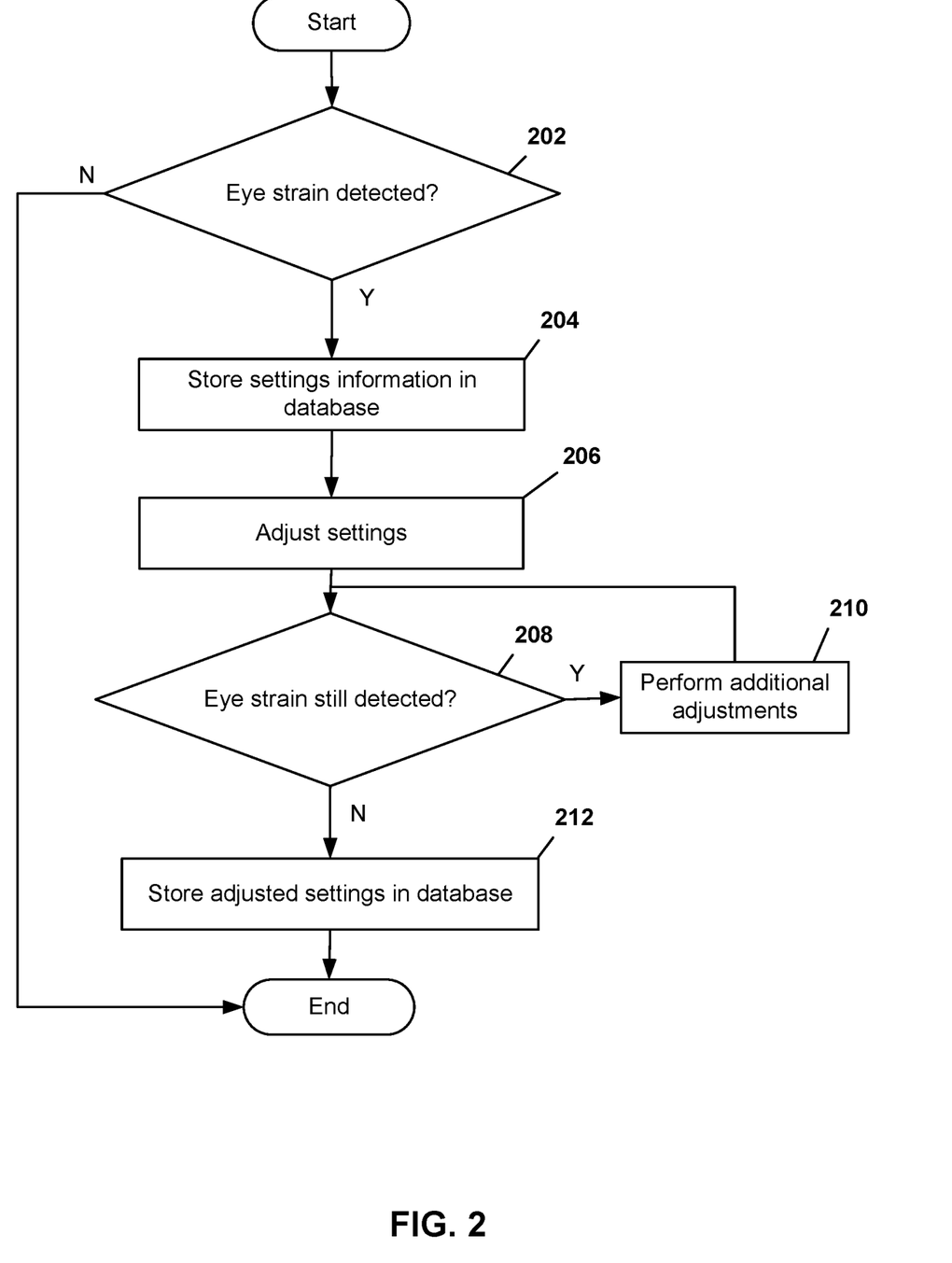
FIG. 2 is a flowchart illustrating the operations of the strain detection application of FIG. 1 in detecting if a user is experiencing eyestrain and then identifying and storing adjusted display settings that do not cause eyestrain for the user, in accordance with an embodiment.

FIG. 2 is a flowchart illustrating the operations of strain detection application 124 in detecting if a user is experiencing eyestrain and then identifying and storing adjusted display settings that do not cause eyestrain for the user, in accordance with an embodiment. In the example embodiment, strain detection application 124 detects whether the user of computing device 110 is experiencing eyestrain (decision 202). In the example embodiment, strain detection application 124 may communicate with strain detection application 112 in order to gather information utilizing one or more modules of computing device 110. For example, strain detection application 112 may gather information utilizing a camera of computing device 110, such as information corresponding to the blink rate of the user (how often and how long a user blinks), the distance the user is from the display screen (may be calculated from an image of the user using geometric techniques), image information of the user (such as the level/amount of how open the user's eyes are), environmental conditions of the area the user is in (such as the dimness of the room, the brightness of the room, glare conditions caused by sunlight, a view direction of the user, and additional information pertaining to the user viewing the display screen. Furthermore, strain detection application 112 may gather audio information by utilizing a microphone module on computing device 110, or may connect with an alternate device, such as a smartphone to gather audio/video information corresponding to the user.

In the example embodiment, strain detection application 124 may utilize the gathered information to determine whether or not the user of computing device 110 is experiencing eyestrain. For example, strain detection application 124 may analyze the information and determine that the user of computing device 110 has a blink rate that is consistent with a user that is experiencing eyestrain. Additionally, strain detection application 124 may reference user database 122 and compare the analyzed information, such as the blink rate to historical blink rates corresponding to the user, and determine whether the user is experiencing eyestrain based on the comparison. Further, the environmental conditions may be analyzed and taken into account when determining whether the user is experiencing eyestrain. For example, strain detection application 124 may reference user database 122 and determine a historic blink rate of the user that corresponds to the detected brightness in the user's environment. Strain detection application 124 may then compare the current blink rate of the user to the specific historic blink rate (corresponding to the detected brightness level) to determine whether the user is experiencing eyestrain. In a similar manner, strain detection application 124 may take other information into account when determining if the user is experiencing eyestrain, such as the distance of the user from the display screen, additional historic blink and image information associated with the user (the amount the user typically keeps his/her eyes open), length of blinks, and other information, such as the information discussed above. In addition, strain detection application 124 may compare current images of the user captured by a camera module of computing device 110 to historic images that were captured in similar conditions to identify whether the user is squinting or straining his/her eyes in an irregular manner. Furthermore, in one or more embodiments, the gathered information, such as the blink rate or level of squinting of the user, may be compared to general information, such as information corresponding to the population as a whole, or a specific sector of the population. For example, based on certain characteristics (such as age, race, sex, profession, etc.), strain detection application 124 may create a model of the user and further compare the eyestrain information gathered to information corresponding to other users that also correspond to the model. In other words, if, based on the characteristics of User A, strain detection application 124 determines that User A corresponds to model 1, strain detection application 124 may identify, from user database 122, eyestrain information corresponding to one or more other users that correspond to model 1, and determine whether User A is experiencing eyestrain based on comparing the eyestrain information of User A to the eyestrain information of the identified one or more users in user database 122.

If strain detection application 124 determines that the user of computing device 110 is not experiencing eyestrain (decision 202, "NO" branch), strain detection application 124 may continue to monitor computing device 110 and analyze eyestrain information as it is collected. If strain detection application 124 determines that the user of computing device 110 is experiencing eyestrain (decision 202, "NO" branch), strain detection application 124 identifies the current settings (i.e., settings 116) that are causing the user eyestrain, and further stores the settings in user database 122 for future reference (step 204). In addition to storing the settings in user database 122, strain detection application 124 may also store the environmental conditions (such as brightness in the room, time of day, the distance the user is from the display screen, location information, etc.) in association with the settings.

Furthermore, based on determining that the user of computing device 110 is experiencing eyestrain, strain detection application 124 may adjust settings 116 in an effort to reduce the amount of eyestrain experienced by the user of computing device 110 (step 206). In the example embodiment, strain detection application 124 may analyze the eyestrain information, which may include the environmental conditions of the user, and based on the eyestrain information, determine how to adjust settings 116. For example, if strain detection application 124 determines that the room is dim-lit, strain detection application 124 may adjust (increase) the brightness settings in settings 116. Furthermore, strain detection application 124 may perform a "trial and error" period where adjustments to settings 116 may be made and eyestrain information is gathered (and analyzed) to identify if the adjustments were successful in reducing the amount of eyestrain experienced by the user. In one or more embodiments, a "trial and error" period may occur for each unique environmental circumstance. In further embodiments, strain detection application 124 may identify settings based on eyestrain information of one or more other users that correspond to the same "model" of the user of computing device 110, as described above. For example, strain detection application 124 may identify settings associated with one or more users that correspond to the "model" of the user of computing device 110 that were identified as reducing eyestrain. Strain detection application 124 may adjust settings 116 in accordance with the identified settings associated with the one or more users, and may make further adjustments based on continuing to gather and analyze eyestrain information of the user of computing device 110.

In the example embodiment, strain detection application 124 determines whether the user of computing device 110 is still experiencing eyestrain (decision 208). In the example embodiment, as stated above, after adjusting settings 116, strain detection application 124 may continue to gather and analyze eyestrain information to identify whether the user of computing device 110 is still experiencing eyestrain. In the example embodiment, strain detection application 124 may determine whether the user is still experiencing eyestrain based on comparing eyestrain information to historical eyestrain information corresponding to the user or one or more other users that fit within the "model" corresponding to the user. For example, strain detection application 124 may compare the current blink rate to historical information detailing an average blink rate for users corresponding to the model (in conditions where the users are not experiencing eyestrain). In another example, strain detection application 124 may compare a current image of the user to a previously captured image of the user in similar conditions (where the user was not experiencing eyestrain). In this example, strain detection application 124 may compare attributes such as an amount that the eye is open to identify if the user is still experiencing eyestrain.

If strain detection application 124 determines that the user is still experiencing eyestrain (decision 208, "YES" branch), strain detection application 124 may perform additional adjustments to settings 116 and then re-evaluate whether the user continues to experience eyestrain based on gathering and analyzing eyestrain information (step 210). If strain detection application 124 determines that the user is no longer experiencing eyestrain (decision 208, "NO" branch), strain detection application 124 stores the adjusted settings in user database 122 (step 212). Furthermore, in the example embodiment, strain detection application 124 may additionally store information corresponding to the environmental conditions (such as brightness of the room, the distance the user is from the display screen, location information, and time of day) in association with the adjusted settings. In other embodiments, strain detection application 124 may not store the information listed above in association with the adjusted settings, or alternatively, may store a portion of the information listed above in association with the adjusted settings.

In other embodiments, in determining whether the user is still experiencing eyestrain, strain detection application 124 may determine whether the eyestrain experienced by the user of computing device 110 has been reduced by a threshold amount (such as a threshold percentage). For example, if strain detection application 124 determines that the eyestrain of the user of computing device 110 has been reduced by the threshold amount, strain detection application 124 may determine that the adjusted settings are adequate, and may further store in the settings in user database 122 in association with the environmental conditions, as described above.

In the example embodiment, the stored adjusted settings may be utilized by strain detection application 124 at a later time in order to determine the optimal settings to adjust settings 116 to based on the situation (environmental conditions, etc.).

Figure 3:
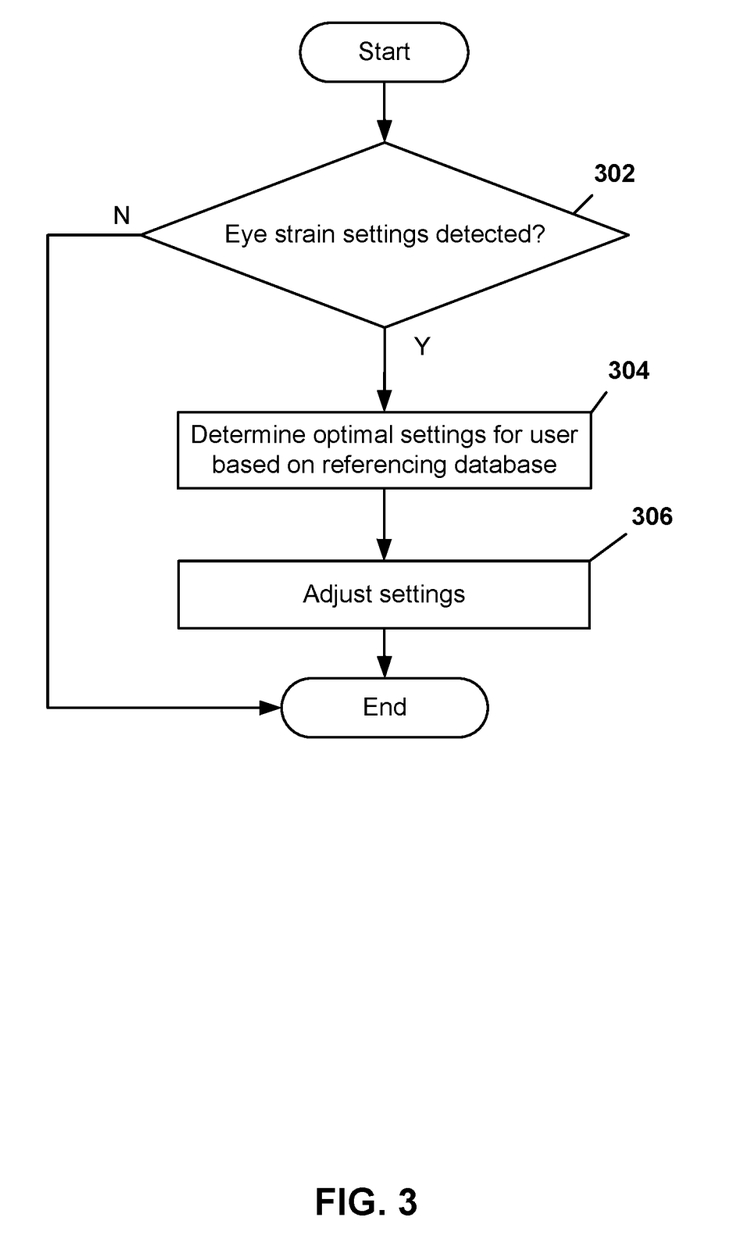
FIG. 3 is a flowchart illustrating the operations of strain detection application of FIG. 1 in detecting if the current display settings correspond to settings that have been identified to cause eyestrain, and based on the detection, adjusting the display settings, in accordance with an embodiment.

FIG. 3 is a flowchart illustrating the operations of strain detection application 124 in detecting if the current display settings correspond to settings that have been identified to cause eyestrain, and based on the detection, adjusting the display settings based on referencing information in user database 122, in accordance with an embodiment. In the example embodiment, strain detection application 124 determines whether the current display settings are eyestrain settings (settings that may cause eyestrain for the user of computing device 110) by comparing the current display settings with settings stored in user database 122 that have been identified as causing eyestrain for the user of computing device 110 (decision 302). In the example embodiment, if strain detection application 124 determines that the current display settings are the same or substantially similar to stored settings that have been identified as causing eyestrain for the user of computing device 110, strain detection application 124 may determine that the current display settings are eyestrain settings, and therefore, may cause eyestrain for the user of computing device 110. In the example embodiment, substantially similar may refer to settings that share a 90% or higher similarity level. In other embodiments, substantially similar may refer to settings that share a 50% or greater similarity level. When determining a similarity level, strain detection application 124 may apply different weight levels to each eyestrain attribute that is analyzed. Furthermore, in the example embodiment, strain detection application 124 may compare the current display settings to stored settings that correspond to attributes that are similar to the current attributes of the environment of the user of computing device 110. For example, attributes such as brightness of the room, time of day, distance from the display screen, and location information may be taken into account.

If strain detection application 124 determines that the current display settings are not eyestrain settings (decision 302, "NO" branch), strain detection application 124 continues to monitor eyestrain information corresponding to computing device 110. If strain detection application 124 determines that the current display settings are eyestrain settings (decision 302, "YES" branch), strain detection application 124 determines the optimal display settings for the user of computing device 110 by referencing display settings information in user database 122 (step 304). In the example embodiment, user database 122 includes information corresponding to display settings for the user of computing device 110, such as one or more sets of display settings that have been identified to cause eyestrain to the user in one or more specific sets of conditions, and also one or more sets of display settings that have been identified as causing minimal or no eyestrain to the user in one or more specific sets of conditions. Therefore, in the example embodiment, strain detection application 124 identifies display settings in user database 122 that have been identified as causing minimal or no eyestrain and that further correspond to the specific conditions of the current environment of the user of computing device 110. For example, by analyzing current information that has been gathered, strain detection application 124 may identify a brightness level in the room of the user, a distance that the user is from the display screen (using geometric techniques), and further a current time of day. In this example, strain detection application 124 may identify optimal display settings in user database 122 (settings that have been identified as not causing eyestrain to the user) that correspond to the user of computing device 110, and further correspond to the brightness level, distance from display screen, and time of day associated with the current environment of the user of computing device 110. In other embodiments, strain detection application 124 may identify the optimal display settings by referencing settings information in user database 122 that correspond to one or more other users that fit within the same "model" as the user of computing device 110, as described above.

In the example embodiment, strain detection application 124 adjust settings 116 based on the identified optimal display settings (step 306). Additionally, further adjustments may be made to settings 116 based on information gathered by utilizing one or more modules associated with computing device 110 (or located in the environment of the user of computing device 110), after the initial adjustments have been made. For example, strain detection application 124 may perform an adjustment to settings 116 based on the identified optimal display settings, and may further perform an additional adjustment based on eyestrain information gathered after the initial adjustment was made.

Figure 4:
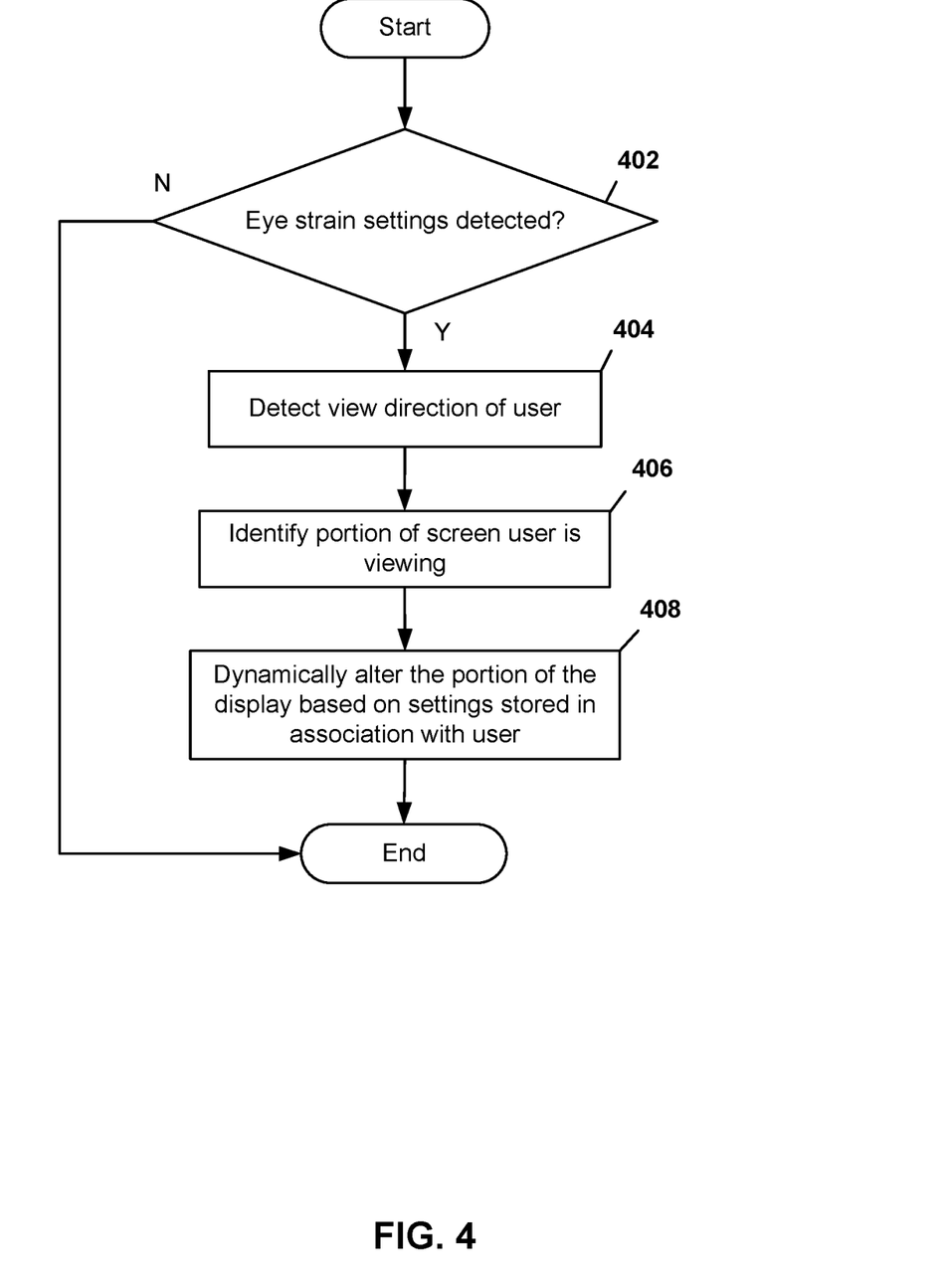
FIG. 4 is a flowchart illustrating the operations of strain detection application of FIG. 1 in detecting a view direction of the user, and altering a portion of the display based on settings stored in association with the user, in accordance with an embodiment.

FIG. 4 is a flowchart illustrating the operations of strain detection application 124 in detecting a view direction of the user, and altering a portion of the display based on settings stored in association with the user, in accordance with an embodiment. In the example embodiment, strain detection application 124 determines whether the user of computing device 110 is experiencing eyestrain (decision 402), in the same manner as described above.

If strain detection application 124 determines that the user of computing device 110 is not experiencing eyestrain (decision 402, "NO" branch), strain detection application 124 continues to monitor eyestrain information corresponding to computing device 110. If strain detection application 124 determines that the user of computing device 110 is experiencing eyestrain (decision 402, "YES" branch), strain detection application 124 detects a view direction of the user of computing device 110 (step 404). In the example embodiment, strain detection application 124 may utilize a camera module to track the eye gaze of the user of computing device 110, and further utilize geometric techniques to identify the portion of the screen that the user is viewing (step 406).

Based on identifying the portion of the screen that the user of computing device 110 is viewing, strain detection application 124 may dynamically alter the portion of the display based on the optimal settings stored in association with the user (step 408). In the example embodiment, strain detection application 124 may utilize (or communicate with) strain detection application 112 in order to dynamically alter the portion of the display. For example, strain detection application 124 may access user database 122 and identify the display settings that have been identified as not causing eyestrain to the user of computing device 110, and further correspond to one or more conditions associated with the environment of the user of computing device 110, as described above. Further, strain detection application 124 may dynamically alter specific portions of the display to correspond to the optimal display settings as the user views them by way of communicating or instructing strain detection application 112. For example, if the user is viewing an article, strain detection application 124 may identify the portion of the article that is being viewed at any given moment, and dynamically alters each identified portion (such as the text) of the article to correspond with the identified optimal display settings as the user reads it.

While in the example embodiment, strain detection application 124 utilizes strain detection application 112 to gather eyestrain information corresponding to the user of computing device 110, in other embodiments, strain detection application 124 may perform all determinations as described above, as well as performing functions related to gathering eyestrain information and further adjusting display settings and/or dynamically altering relevant portions of the display screen (without utilizing a client side application, such as strain detection application 112). In further embodiments, strain detection application 124 may be located on computing device 110, and perform all functions described above from the client side (in these further embodiments, strain detection application 112 may not be present). Furthermore, in these further embodiments, user database 122 may be located on server 120 or may be located on computing device 110. Additionally, in these further embodiments, user database 122 may include display settings information corresponding only to the user of computing device 110, or alternatively, may include display settings information corresponding to the user of computing device 110 and display settings information corresponding to one or more other users that utilize an iteration of strain detection application 124.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 5:
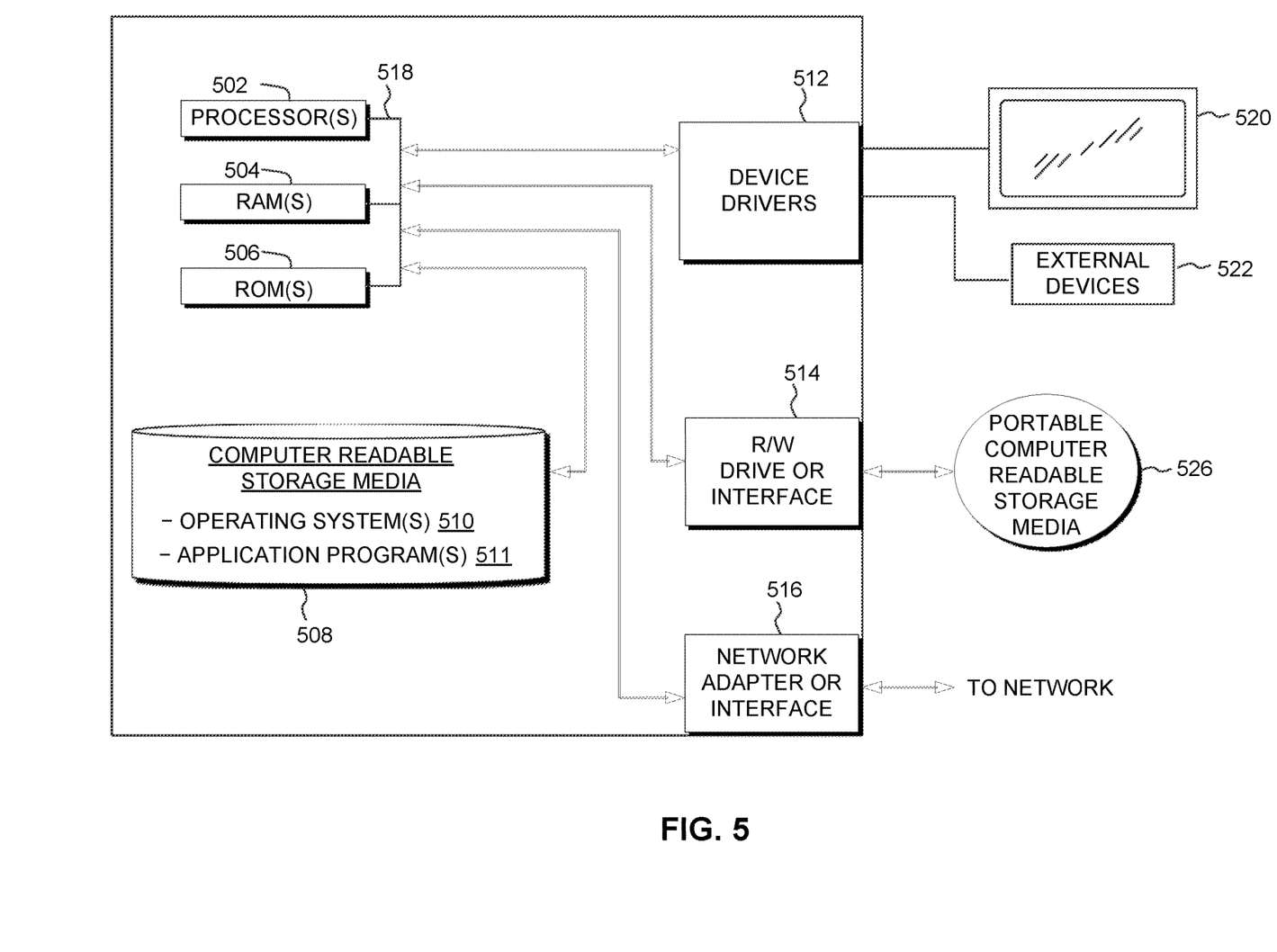
FIG. 5 is a block diagram depicting the hardware components of the strain detection system of FIG. 1, in accordance with an embodiment.

FIG. 5 depicts a block diagram of components of computing devices contained in strain detection system 100 of FIG. 1, in accordance with an embodiment. It should be appreciated that FIG. 5 provides only an illustration of one implementation and does not imply any limitations with regard to the environments in which different embodiments may be implemented. Many modifications to the depicted environment may be made.

Computing devices may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, strain detection application 124, are stored on one or more of the computer readable storage media 508 for execution by one or more of the processors 502 and by utilizing one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 514 to read from and write to one or more portable computer readable storage media 526. Application programs 511 on the computing devices may be stored on one or more of the portable computer readable storage media 526, read via the respective R/W drive or interface 514 and loaded into the respective computer readable storage media 508.

Computing devices may also include a network adapter or interface 516, such as a TCP/IP adapter card or wireless communication adapter (such as a 4G wireless communication adapter using OFDMA technology). Application programs 511 on the computing devices may be downloaded to the computing devices from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Computing devices may also include a display screen 520, and external devices 522, which may include, for example a keyboard, a computer mouse and/or touchpad. Device drivers 512 interface to display screen 520 for imaging, to external devices 522, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
   one or more computer-readable memories storing program instructions; and
   one or more processors configured to execute the program instructions to cause the system to perform operations comprising:
      analyzing eyestrain information to detect, during a first time period, whether a user of a computing device is experiencing eyestrain;
      in response to detecting, during the first time period, that the user of the computing device is experiencing eyestrain:
         detecting a viewing direction of the user of the computing device,
         identifying a portion of a display screen currently viewed by the user of the computing device based on the detected viewing direction of the user,
         identifying a first set of display settings corresponding to the computing device based at least in part on the identified portion of the display screen currently viewed by the user,
         storing the identified first set of display settings in a database,
         adjusting at least one of the first set of display settings, and
         in response to detecting that a reduction in the eyestrain being experienced by the user of the computing device exceeds a threshold amount, storing the adjusted first set of display settings in the database;
      determining, during a second time period, without detecting whether the user is experiencing eyestrain during the second time period, that a second set of display settings associated with the second time period corresponds to the user experiencing eyestrain based on determining that the second set of display settings are substantially similar to the identified first set of display settings stored in the database; and
      in response to the determining, during the second time period, that the second set of display settings corresponds to the user experiencing eyestrain, adjusting at least one of the second set of display settings based on referencing the adjusted first set of display settings stored in the database.

2. The system of claim 1, wherein the eyestrain information includes one or more of a blink rate corresponding to the user, an amount corresponding to how open the eyes of the user are, a distance that the user is from the display screen of the computing device, or environmental conditions of the location of the computing device.

3. The system of claim 1, wherein the eyestrain information includes environmental conditions of the location of the computing device including a brightness level of the location of the computing device and an amount of glare corresponding to the display screen of the computing device.

4. The system of claim 1, wherein the detecting whether the user is experiencing eyestrain includes determining a current blink rate corresponding to the user, and comparing the determined current blink rate to one or more historical blink rates that correspond to one or more situations where the user experienced eyestrain.

5. The system of claim 1, wherein the detecting whether the user is experiencing eyestrain includes determining a current blink rate corresponding to the user, and comparing the determined current blink rate to one or more historical blink rates that correspond to one or more situations where one or more other users that correspond to the user experienced eyestrain.

6. The system of claim 1, wherein the first set of display settings and the second set of display settings are the same.

7. The system of claim 1, wherein the adjusted first set of display settings are stored in the database in association with one or more environmental conditions of the location of the computing device.

8. The system of claim 1, wherein the adjusting the at least one of the first set of display settings includes referencing the database and identifying one or more adjustments associated with one or more other users that share one or more characteristics with the user.

9. The system of claim 1, wherein the detecting, during the first time period, that the user of the computing device is experiencing eyestrain is based on determining a level of squint of the user.

10. A method, comprising:
analyzing eyestrain information to detect, during a first time period, whether a user of a computing device is experiencing eyestrain;
in response to detecting that the user of the computing device is experiencing eyestrain:
identifying a first set of display settings corresponding to the computing device,
storing the identified first set of display settings in a database,
adjusting at least one of the first set of display settings, and
in response to detecting that a reduction in the eyestrain being experienced by the user of the computing device exceeds a threshold amount, storing the adjusted first set of display settings in the databases;
determining, during a second time period, without detecting whether the user is experiencing eyestrain during the second time period, that a second set of display settings associated with the second time period corresponds to the user experiencing eyestrain based on determining that the second set of display settings are substantially similar to the identified first set of display settings stored in the database; and
in response to the determining, during the second time period, that the second set of display settings corresponds to the user experiencing eyestrain, adjusting at least one of the second set of display settings based on referencing the adjusted first set of display settings stored in the database.

11. The method of claim 10, further comprising:
in response to the determining:
accessing the database and identifying that one or more environmental conditions associated with the first set of display settings correspond with one or more environmental conditions associated with the second set of display settings.

12. The method of claim 10, wherein the eyestrain information includes a blink rate corresponding to the user, an amount corresponding to how open the eyes of the user are, a distance that the user is from a display screen of the computing device, and environmental conditions of the location of the computing device.

13. The method of claim 12, wherein the environmental conditions of the location of the computing device include a brightness level of the location of the computing device.

14. The method of claim 10, wherein the detecting whether the user is experiencing eyestrain includes determining a current blink rate corresponding to the user, and comparing the determined current blink rate to one or more historical blink rates that correspond to one or more situations where the user experienced eyestrain.

15. The method of claim 10, further comprising:
in response to the determining:
accessing the database and identifying that one or more environmental conditions associated with the first set of display settings correspond with one or more environmental conditions associated with the second set of display settings, and
determining a portion of a display screen of the computing device being currently viewed by the user,
wherein adjusting the at least one of the second set of display settings is based on the determining the position of the display screen being currently viewed by the user.

16. The method of claim 10, wherein the adjusted first set of display settings are stored in the database in association with one or more environmental conditions of the location of the computing device.

17. A non-transitory computer-readable medium storing computer-executable instructions, that in response to execution by one or more hardware processors, causes the one or more hardware processors to perform operations comprising:
analyzing eyestrain information to detect, during a first time period, whether a user of a computing device is experiencing eyestrain;
in response to detecting, during the first time period, that the user of the computing device is experiencing eyestrain:
detecting a viewing direction of the user of the computing device,
identifying a portion of a display screen currently viewed by the user of the computing device based on the detected viewing direction of the user,
identifying a first set of display settings corresponding to the computing device based at least in part on the identified portion of the display currently viewed by the user, and
adjusting the portion of the display screen based on first set of display settings;
determining, during a second time period, without detecting whether the user is experiencing eyestrain during the second time period, that a second set of display settings associated with the second time period corresponds to the user experiencing eyestrain based on determining that the second set of display settings are substantially similar to the first set of display settings stored in the database; and
in response to the determining, during the second time period, that the second set of display settings corresponds to the user experiencing eyestrain, adjusting the portion of the display screen.

18. The non-transitory computer-readable medium of claim 17, wherein the eyestrain information includes a blink rate corresponding to the user, an amount corresponding to how open the eyes of the user are, a distance that the user is from the display screen of the computing device, and environmental conditions of the location of the computing device.

19. The non-transitory computer-readable medium of claim 18, wherein the environmental conditions of the location of the computing device include a brightness level of the location of the computing device, and an amount of glare corresponding to the display screen of the computing device.

20. The non-transitory computer-readable medium of claim 17, wherein the detecting whether the user is currently experiencing eyestrain includes determining a current blink rate corresponding to the user, and comparing the determined current blink rate to one or more historical blink rates that correspond to one or more situations where the user experienced eyestrain.

\* \* \* \* \*

UNITED STATES PATENT AND TRADEMARK OFFICE
CERTIFICATE OF CORRECTION

PATENT NO. : 10,878,778 B2
APPLICATION NO. : 15/806884
DATED : December 29, 2020
INVENTOR(S) : Timothy Resudek and Joshua Greenwell Page 1 of 1

It is certified that error appears in the above-identified patent and that said Letters Patent is hereby corrected as shown below:

In the Claims

In Column 13, Claim 10, Line 44, changed "databases" to --database--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*